US009229515B2

(12) United States Patent  
Chang et al.

(10) Patent No.: US 9,229,515 B2  
(45) Date of Patent: Jan. 5, 2016

(54) CLOUD MANAGEMENT METHOD OF ELECTRONIC DEVICES

(71) Applicant: Taiwan Gomet Technology Co. Ltd., New Taipei (TW)

(72) Inventors: Sheng-Hsiung Chang, New Taipei (TW); Sheng-Yuan Chang, New Taipei (TW)

(73) Assignee: Taiwan Gomet Technology Co. Ltd., New Taipei (TW)

( * ) Notice: Subject to any disclaimer, the term of this patent is extended or adjusted under 35 U.S.C. 154(b) by 335 days.

(21) Appl. No.: 13/676,737

(22) Filed: Nov. 14, 2012

(65) Prior Publication Data

US 2014/0136380 A1    May 15, 2014

(51) Int. Cl.

| G06F 1/00 | (2006.01) |
|---|---|
| G06F 1/26 | (2006.01) |
| G06F 1/28 | (2006.01) |
| G06Q 30/00 | (2012.01) |
| G06Q 10/00 | (2012.01) |
| G06F 1/32 | (2006.01) |

(52) U.S. Cl.
CPC ........ G06F 1/28 (2013.01); G06Q 10/20 (2013.01); G06Q 30/012 (2013.01); G06F 1/32 (2013.01)

(58) Field of Classification Search
CPC .................................... G06F 1/26; G06F 1/32
USPC .......................................... 713/320, 324, 340
See application file for complete search history.

(56) References Cited

U.S. PATENT DOCUMENTS

| 2005/0052814 | A1* | 3/2005 | McNally et al. .............. 361/166 |
|---|---|---|---|
| 2006/0164769 | A1* | 7/2006 | Stanford et al. ................ 361/87 |
| 2007/0067656 | A1* | 3/2007 | Ranganathan et al. ....... 713/320 |
| 2009/0207034 | A1* | 8/2009 | Tinaphong et al. .......... 340/635 |
| 2010/0008006 | A1* | 1/2010 | Satoru et al. ................. 361/93.1 |
| 2010/0169689 | A1* | 7/2010 | Liu .............................. 713/340 |
| 2010/0201313 | A1* | 8/2010 | Vorenkamp et al. ......... 320/108 |
| 2010/0231043 | A1* | 9/2010 | Hu ................................. 307/39 |
| 2012/0054512 | A1* | 3/2012 | Archibald et al. ........... 713/320 |
| 2012/0330475 | A1* | 12/2012 | Chen ........................... 700/292 |
| 2014/0207300 | A1* | 7/2014 | Yun et al. ..................... 700/292 |
| 2014/0304058 | A1* | 10/2014 | Krig et al. ................. 705/14.34 |

* cited by examiner

*Primary Examiner* — Jaweed A Abbaszadeh  
*Assistant Examiner* — Phil Nguyen  
(74) *Attorney, Agent, or Firm* — Saliwanchik, Lloyd & Eisenschenk

(57) ABSTRACT

A cloud management method of electronic devices is disclosed herein. The method comprises collecting at least one first information from a electronic device by an information collector comprising a safe power switch; calculating a temporary safe interruption value by the information collector via analyzing a predetermined number of times of a working current or voltage of the electronic device, or calculating a safe interruption value by a local server or a first server; and writing back the temporary safe interruption value or the safe interruption value to the safe power switch. Preferably, a power supply of the electronic device is cut off by the safe power switch in response to the working current or voltage surpassing the temporary safe interruption value or the safe interruption value.

36 Claims, 5 Drawing Sheets

CLOUD MANAGEMENT METHOD OF ELECTRONIC DEVICES

BACKGROUND OF THE INVENTION

1. Field of the Invention

The present invention generally relates to a cloud management method, in particular to a cloud management method of electronic devices.

2. Description of the Related Art

In each company and family, many electronic devices or electrical devices are bought at different time points. Each one of the electronic devices or electrical devices might have a warranty expiration date, which is quite different from each other. However, most of the consumers do not minute down or remember the warranty expiration date. Hence, in most of the cases, the consumer would find out that the warranty of the electronic devices or electrical devices has expired when the electronic devices or electrical devices are malfunctioned and sent for repair. At the time, the consumer may pay lots of money for the repair of the electronic devices or electrical devices. However, in case of that the consumer extends the warranty expiration date ahead of warranty expiration date, the consumer would save a lot of expense in repairing the malfunctioned electronic devices or electrical devices.

On the other hand, the manufacturers manufacture the electronic devices or electrical devices based on the perspective of the designer. The designer designs the electronic devices or electrical devices by using different kind of experimental model to calculate the flaws or durability of the electronic devices or electrical devices in the laboratory. The designer does not consider the potential problems the users would have in the practical use. Thus, there is lack of comprehensive and large-scale feedback from the users to the manufacturers as a basis for the improvement of the electronic devices or electrical devices. In this way, the users may only purchase the electronic devices or electrical devices by referencing to the brochure or fliers provided by the manufacturers without know the actual performance of the electronic devices or electrical devices in advance.

BRIEF SUMMARY

Therefore, it is a primary objective of the present invention to provide a cloud management method of electronic devices to achieve the effects of reminding warranty expiration, automatically writing back a safe interruption value and feedback of practical uses in various regions for modifying the electronic device.

To achieve the foregoing objective, the present invention provides a cloud management method of electronic devices, comprising following steps of: collecting at least one first information from a electronic device by an information collector comprising a safe power switch; calculating a temporary safe interruption value by the information collector via analyzing a predetermined number of times of a working current or voltage of the electronic device, or calculating a safe interruption value by a local server or a first server; and writing back the temporary safe interruption value or the safe interruption value to the safe power switch. Wherein, a power supply of the electronic device is cut off by the safe power switch in response to the working current or voltage surpassing the temporary safe interruption value or the safe interruption value.

In a preferred embodiment of the present invention, the method may further comprise a step of compiling and uploading the at least one first information to the first server via the local server through a network immediately or in a predetermined time interval.

In a preferred embodiment of the present invention, the information collector may be built-in to the electronic device.

In a preferred embodiment of the present invention, the method may further comprise a step of registering the electronic device with predetermined information automatically to a personal account in the first server.

In a preferred embodiment of the present invention, the predetermined information comprising a brand, a model name, a serial number, a first working time, an installed position, internal modules data, the safe interruption value, a manufacturer and a warranty expiration date of the electronic device may be automatically registered to the personal account in the first server when the electronic device is connected to the first server via the local server.

In a preferred embodiment of the present invention, the method may further comprise a step of determining a malfunction of internal modules of the electronic device by the local server or the first server according to the built-in information collector connected to internal module sensors in the electronic device.

In a preferred embodiment of the present invention, the internal modules may comprise a power module, a video module, an audio module, a driving module, a heating module and a timer module.

In a preferred embodiment of the present invention, the at least one first information may comprise a real-time working status of internal modules, a real-time current consumption of the electronic device, ambient temperature and ambient humidity.

In a preferred embodiment of the present invention, the method may further comprise a step of obtaining at least one second information by analyzing the at least one first information by the first server.

In a preferred embodiment of the present invention, the at least one second information may comprise an actual mean time between failures (MTBF), a malfunction time, a malfunction frequency, a frequent malfunctioned module, a working period, total working hours and working status records of the electronic device.

In a preferred embodiment of the present invention, the information collector may be externally configured with the electronic device.

In a preferred embodiment of the present invention, the method may further comprise a step of registering the electronic device with predetermined information manually to a personal account in the first server by the user.

In a preferred embodiment of the present invention, the predetermined information may comprise a brand, a model name, a serial number, a first working time, an installed position, a manufacturer, a warranty expiration date and the safe interruption value of the electronic device.

In a preferred embodiment of the present invention, the safe interruption value may be found and written back to the safe power switch by the local server or the first server with reference to the predetermined information.

In a preferred embodiment of the present invention, the safe interruption value of the safe power switch may further be capable of being set-up by a user.

In a preferred embodiment of the present invention, the method may further comprise a step of determining a malfunction of the electronic device by the local server or the first server according to the externally configured information collector.

In a preferred embodiment of the present invention, the at least one first information may comprise a real-time working status and a real-time current consumption of the electronic device, ambient temperature and ambient humidity.

In a preferred embodiment of the present invention, the method may further comprise a step of obtaining at least one second information by analyzing the at least one first information by the first server.

In a preferred embodiment of the present invention, the at least one second information may comprise an actual mean time between failures (MTBF), a malfunction time, a malfunction frequency, a working period, total working hours and working status records of the electronic device.

In a preferred embodiment of the present invention, a rated current may be written back to the safe power switch as a substituted safe interruption value by the first server in response to the safe interruption value is higher than the rated current set by the manufacturer.

In a preferred embodiment of the present invention, the method may further comprise a step of sending a notification to a user by the local server or the first server for reminding the user that a warranty expiration date is due in a predetermined time ahead of the warranty expiration date.

In a preferred embodiment of the present invention, the method may further comprise a step of querying the user for extending the warranty expiration date.

In a preferred embodiment of the present invention, the method may further comprise a step of warning a user of cutting off the power supply of the electronic device by the local server or the first server in response to the working current or voltage surpassing a safe warning value.

In a preferred embodiment of the present invention, the safe warning value may be an average of a normal maximum working current or voltage value of the electronic device and the safe interruption value.

In a preferred embodiment of the present invention, the normal maximum working current or voltage value may be automatically elevated by the local server or the first server in response to that the user declining to cut off the power supply of the electronic device in the warning step.

In a preferred embodiment of the present invention, the method may further comprise a step of warning the user of cutting off the power supply of the electronic device by the local server or the first server in response to an abnormal working status of the electronic device.

In a preferred embodiment of the present invention, the abnormal working status may comprise exceeding a safe working temperature, and turn-on or turn-off the electronic device in a non-predetermined time.

In a preferred embodiment of the present invention, the method may further comprise a step of automatically sending a notification to a user or the first server by the information collector through the local server in response to a malfunction of the electronic device.

In a preferred embodiment of the present invention, the method may further comprise a step of automatically sending a notification to the second server to notify the second server to provide a quotation to the local server.

In a preferred embodiment of the present invention, the method may further comprise a step of sending at least one second information to a second server belonging to a manufacturer of the electronic device by the first server.

In a preferred embodiment of the present invention, the manufacturer of the electronic device improves a design of the electronic device according to the at least one second information sent from the first server.

In a preferred embodiment of the present invention, the method may further comprise a step of sending a maintenance request to a second server by the first server to notify a manufacturer of the electronic device to maintain a malfunction of the electronic device before or after a warranty expiration date.

In a preferred embodiment of the present invention, the method may further comprise a step of calculating a fee of extending warranty for providing a maintenance service without a manufacturer of the electronic device after a warranty expiration date.

In a preferred embodiment of the present invention, the method may further comprise a step of posting maintenance information comprising a malfunction frequency and a frequent malfunction module of the electronic device, and a maintenance speed of a manufacturer of the electronic device on a web page by the first server for consumers' reference.

In a preferred embodiment of the present invention, the method may further comprise a step of providing a user with an analysis report of an individual or all of the electronic device by the first server.

In a preferred embodiment of the present invention, the analysis report may comprise total working hours, a working period, a working frequency, a power consumption and variations of temperature and humidity of the electronic device.

In a preferred embodiment of the present invention, the network may comprise wired network and wireless network.

The cloud management method of electronic devices according to the present invention managing the electronic device in the cloud, so that the present invention has the following advantages:

(1) The cloud management method of electronic devices according to the present invention automatically generates maintenance quotation and notification of warranty expiration to the user so as to achieve the electronic operating procedures in order to reduce manpower and the human-based mistake or delay.

(2) The cloud management method of electronic devices according to the present invention can be used to remind the user about the warranty expiration date so as to extend the warranty in advance.

(3) The cloud management method of electronic devices according to the present invention can automatically detect the malfunction of the electronic devices and send a quotation to the user so as to repair the electronic devices in time.

(4) The cloud management method of electronic devices according to the present invention can be used to provide the public with the statistics, comprising frequency of malfunction, frequent malfunctioned module, maintenance speed etc., so that the consumer may have the unbiased information regarding the electronic devices to be bought.

(5) The cloud management method of electronic devices according to the present invention can be used to provide the manufacturer with practical data of using the electronic devices in various environments to facilitate the research and development of the next-generation electronic devices.

(6) The cloud management method of electronic devices according to the present invention can be used to analyzing the actual current variations of the electronic devices in use so as to automatically write back a safe interruption value according to the actual usage to protect the electronic devices.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION

The technical content of the present invention will become apparent by the detailed description of the following embodiments and the illustration of related drawings as follows. The embodiments may be in different forms and should not be construed as limited to the embodiments set forth herein.

Figure 1:
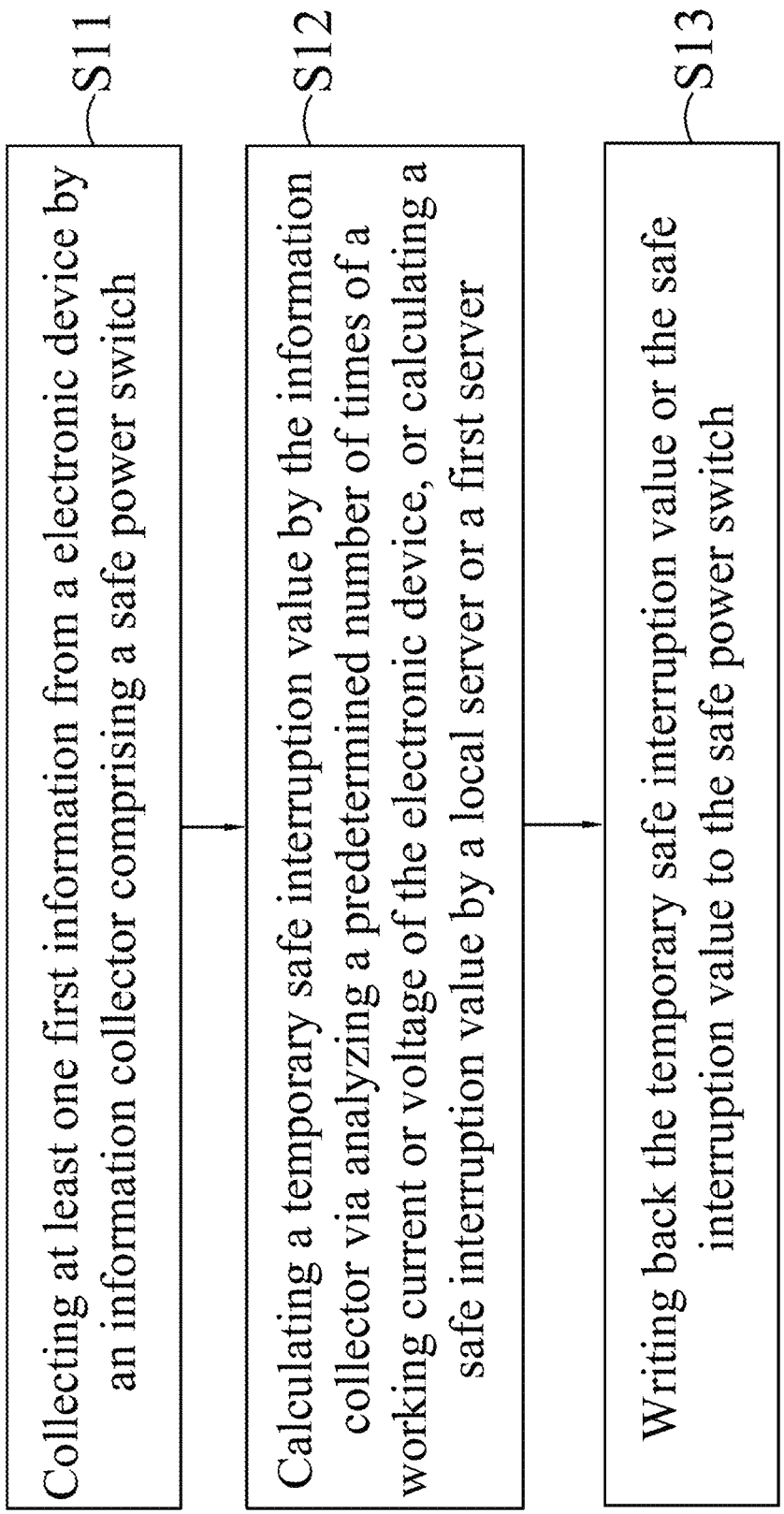
FIG. 1 is a flow chart of a cloud management method of electronic devices in accordance with one embodiment of the present invention.

With reference to FIG. 1 for a flow chart of a cloud management method of electronic devices in accordance with one embodiment of the present invention, the cloud management method for electronic devices may comprise following steps of: S11: collecting at least one first information from an electronic device by an information collector comprising a safe power switch; S12: calculating a temporary safe interruption value by the information collector via analyzing a predetermined number of times of a working current or voltage of the electronic device, or calculating a safe interruption value by a local server or a first server; and S13: writing back the temporary safe interruption value or the safe interruption value to the safe power switch. Preferably, a power supply of the electronic device is cut off by the safe power switch in response to a working current or voltage surpassing the safe interruption value.

With reference to FIGS. 2-5 for a block diagram of a cloud management method of electronic devices in accordance with various embodiments of the present invention, the cloud management method of electronic devices are not construed by the embodiments set forth herein.

Figure 2:
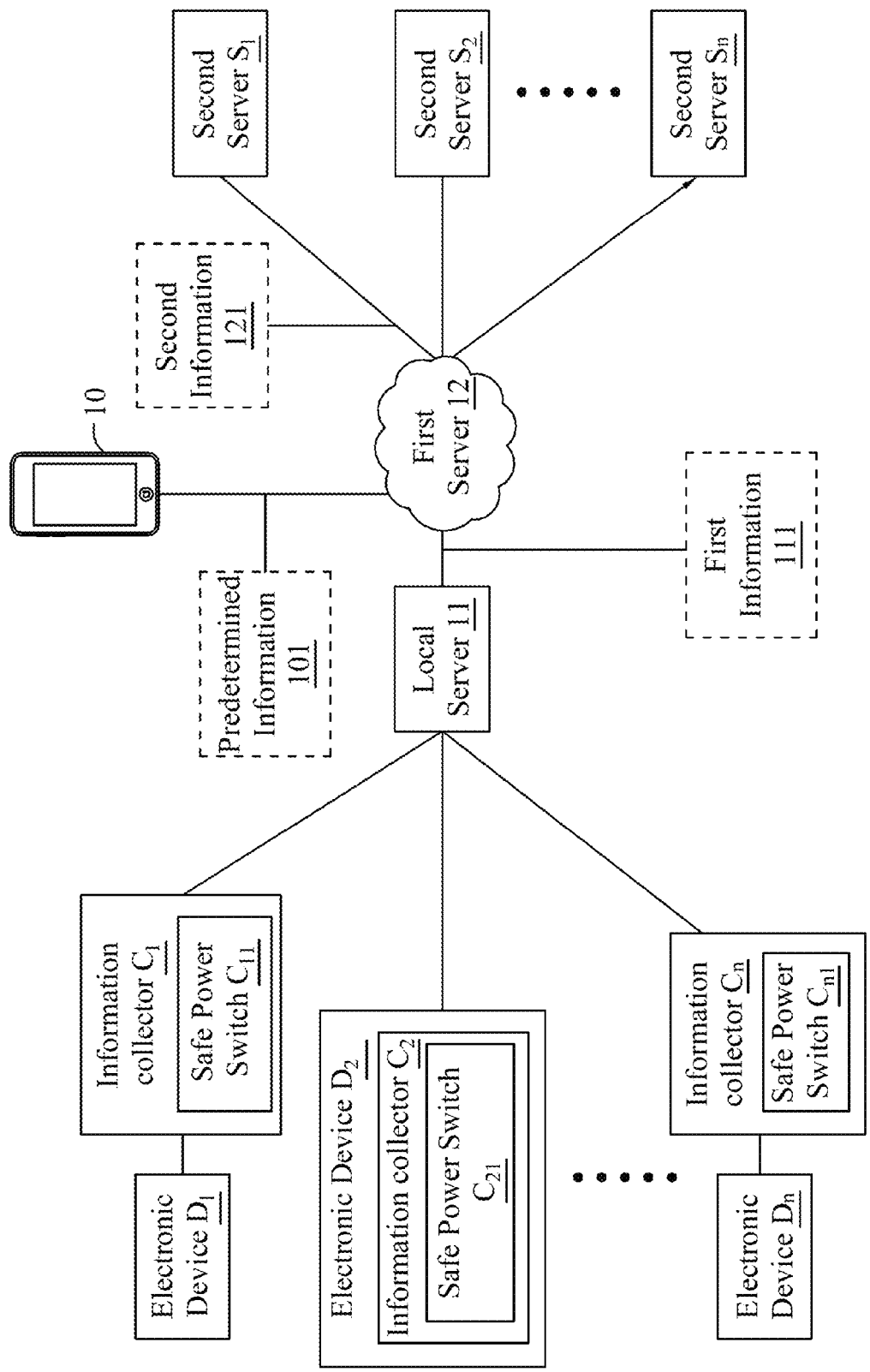
FIG. 2 is a block diagram of a cloud management method of electronic devices in accordance with the first embodiment of the present invention.

Referring to FIG. 2, information collectors $C_1$-$C_n$ may be used to be paired with electronic devices $D_1$-$D_n$, respectively. The information collectors $C_1$-$C_n$ may comprise a transceiver module, a voltage & current analyzer (not shown) and safe power switch $C_{11}$-$C_{n1}$.

The transceiver module, such as wireless transceiver module or power line carrier, may transmit the first information 111 collected from the electronic devices $D_1$-$D_n$ to a local server 11. That is, the first information 111 may be transmitted from the information collectors $C_1$-$C_n$ to the local server 11 with a wire or wirelessly.

In an embodiment, the information collector $C_2$ may be built-in to internal modules of the electronic device $D_2$, and preferably, the current analyzer may record a first information 111 comprising current consumption and a working current or voltage of the individual internal modules of the electronic device $D_2$ when information collector $C_2$ are built-in to the electronic device $D_2$. Wherein, the internal modules of the electronic device $D_2$ may comprise a power module, a VIDEO module, an AUDIO module, a driving module, a heating module and a timer module. The voltage and current analyzers are respectively disposed in the internal modules listed above. In an aspect, the first information 111 may further comprise a real-time working status of internal modules, a real-time current consumption of the electronic device $D_2$, ambient temperature and ambient humidity. When the user uses the electronic device $D_2$ for the first time, predetermined information 101 would be automatically registered to a personal account in the first server 12 via a local server 11 as soon as the information collector $C_2$ connected to the first server 12 via the local server 11. Wherein, the predetermined information 101 may comprise a brand, a model name, a serial number, a first working time, an installed position, the safe interruption value, internal modules data, a manufacturer and a warranty expiration date of the electronic device $D_2$.

In an embodiment, the information collector $C_1$ may be externally configured with the electronic device $D_1$. The voltage and current analyzer may record first information 111 comprising working voltage, the working current and total current consumed by the electronic device $D_1$ when information collector $C_1$ are externally configured with the electronic device $D_1$. Preferably, the first information 111 may comprise a real-time working status and a real-time current consumption of the electronic device $D_1$, ambient temperature and ambient humidity. When the user uses the electronic device $D_1$ for the first time, predetermined information 101 would be manually registered to a personal account in the first server 12 by the user. Wherein, the predetermined information 101 may comprise a brand, a model name, a serial number, a first working time, an installed position and the safe interruption value of the electronic device $D_1$. That is, before collecting the first information 111, the electronic device $D_1$ may be registered to a personal account in a first server 12 by the user. Specifically, only the user 10 being capable of accessing the account may view the current status and working history of the registered electronic device $D_1$, and control the registered electronic device $D_1$.

In an aspect, the externally configured information collector $C_1$ may be a multiple plug socket or an adapter between the electronic device $D_1$ and a plug socket. In another aspect, the externally configured information collector $C_1$ may be configured with a main switch of a house to measure the total power consumption of the house.

The first information 111 may be temporarily stored in the memory of the local server 11. When the local server 11 connects to the first server 12 via a network with wire or wirelessly, the first information 111 collected by the information collectors $C_1$-$C_n$ would be compiled and uploaded to the first server 12 in a predetermined time interval. Particularly, the predetermined time interval may be set by the user 10 according to the needs of the user 10.

In an embodiment, the first information 111 collected by the information collectors $C_1$-$C_n$ would be uploaded to the first server 12 in real-time, that is, immediately. In addition, the user 10 may log in the account via mobile devices or Internet to check the real-time status and using history of the electronic devices $D_1$-$D_n$.

Furthermore, at least one second information 121 may be obtained by analyzing the at least one first information 111 by the first server 12. In an embodiment, the at least one second information 121 may comprise an actual mean time between failures (MTBF), a malfunction time, a malfunction frequency, a frequent malfunctioned module and a working period, total working hours and working status records of the electronic device $D_2$ when the information collector $C_2$ is built-in to the electronic device $D_2$. In another embodiment, the at least one second information 121 may comprise an actual mean time between failures (MTBF), a malfunction time, a malfunction frequency, and a working period, total working hours and working status records of the electronic device $D_1$ when the information collector $C_1$ is externally configured with the electronic device $D_1$. With a permission of the user, the first server 12 may provide the first information 111 and the second information 121 to the second servers $S_1$-$S_m$, i.e. the manufacturer of the electronic devices $D_1$-$D_n$, for improving and modifying next models of the electronic devices $D_1$-$D_n$. Wherein, the second servers $S_1$-$S_m$ may belong to the same or different manufacturers of the electronic devices $D_1$-$D_n$.

Figure 4:
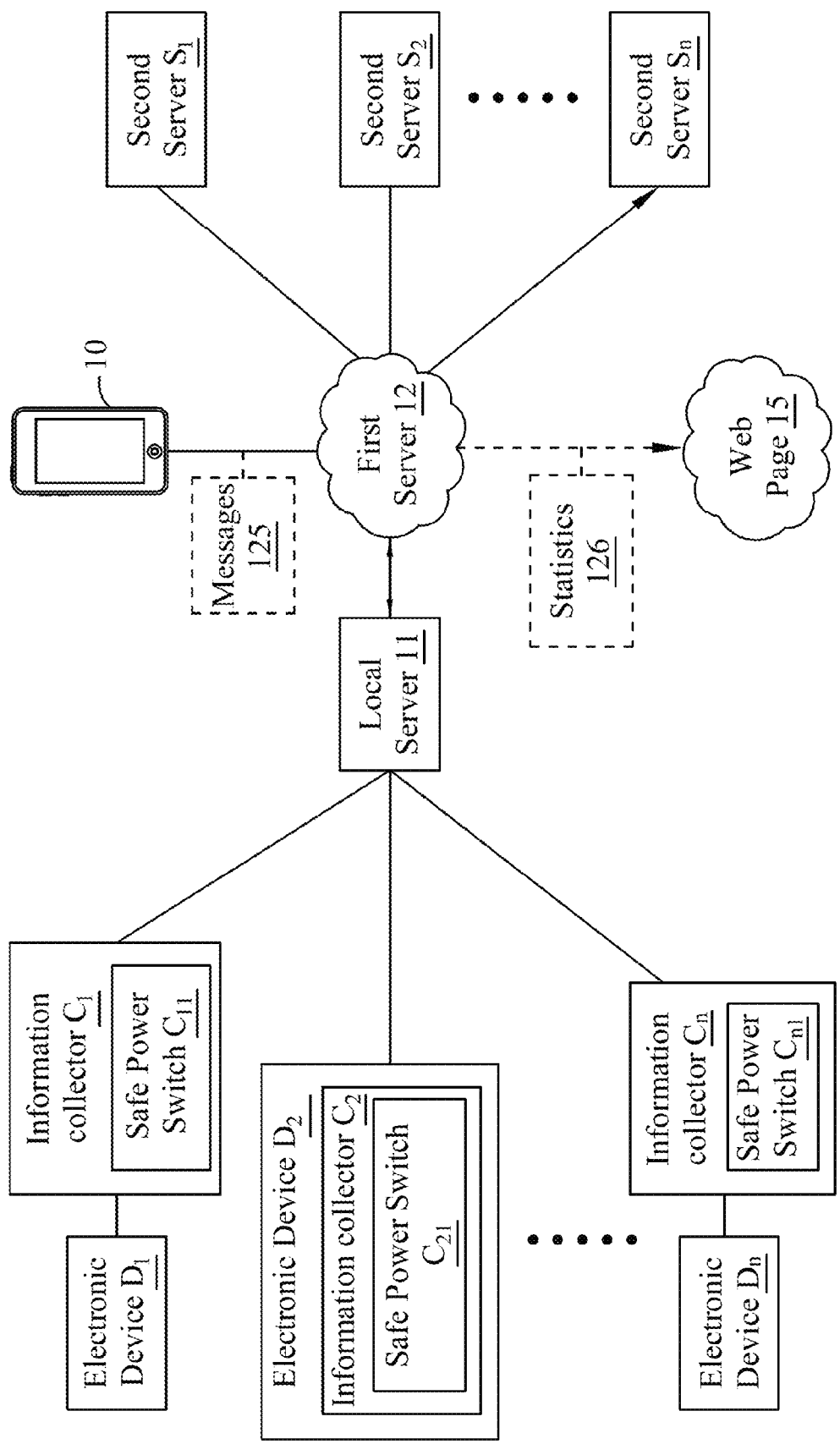
FIG. 4 is a block diagram of a cloud management method of electronic devices in accordance with the third embodiment of the present invention.

More specifically, the first server 12 may collect the first information 111 of the electronic devices $D_1$-$D_n$ located around the world to obtain statistics 126, such as the actual mean time between failures, which would be provided to the manufacturer of the electronic devices $D_1$-$D_n$ for comparing the theoretical values with the actual values so as to be a parameter of modifying the theoretical values. The manufacturer may further revise the design of the electronic devices $D_1$-$D_n$ according to the statistics 126. Nevertheless, the manufacturer may alter the period of warranty and calculate a reasonable warranty extension fee for the consumers. On the other hand, the statistics 126 of the first information 111 and the second information 121 may be collected from around the world and sorted by the model of the electronic devices $D_1$-$D_n$. Consequently, the statistics 126 would be disclosed on a web page for consumers' reference as shown in FIG. 4. Preferably, the statistics 126 may comprise maintenance information comprising a malfunction frequency and a frequent malfunction module of the electronic device $D_2$, and a maintenance speed of a manufacturer of the electronic device $D_2$.

Figure 3:
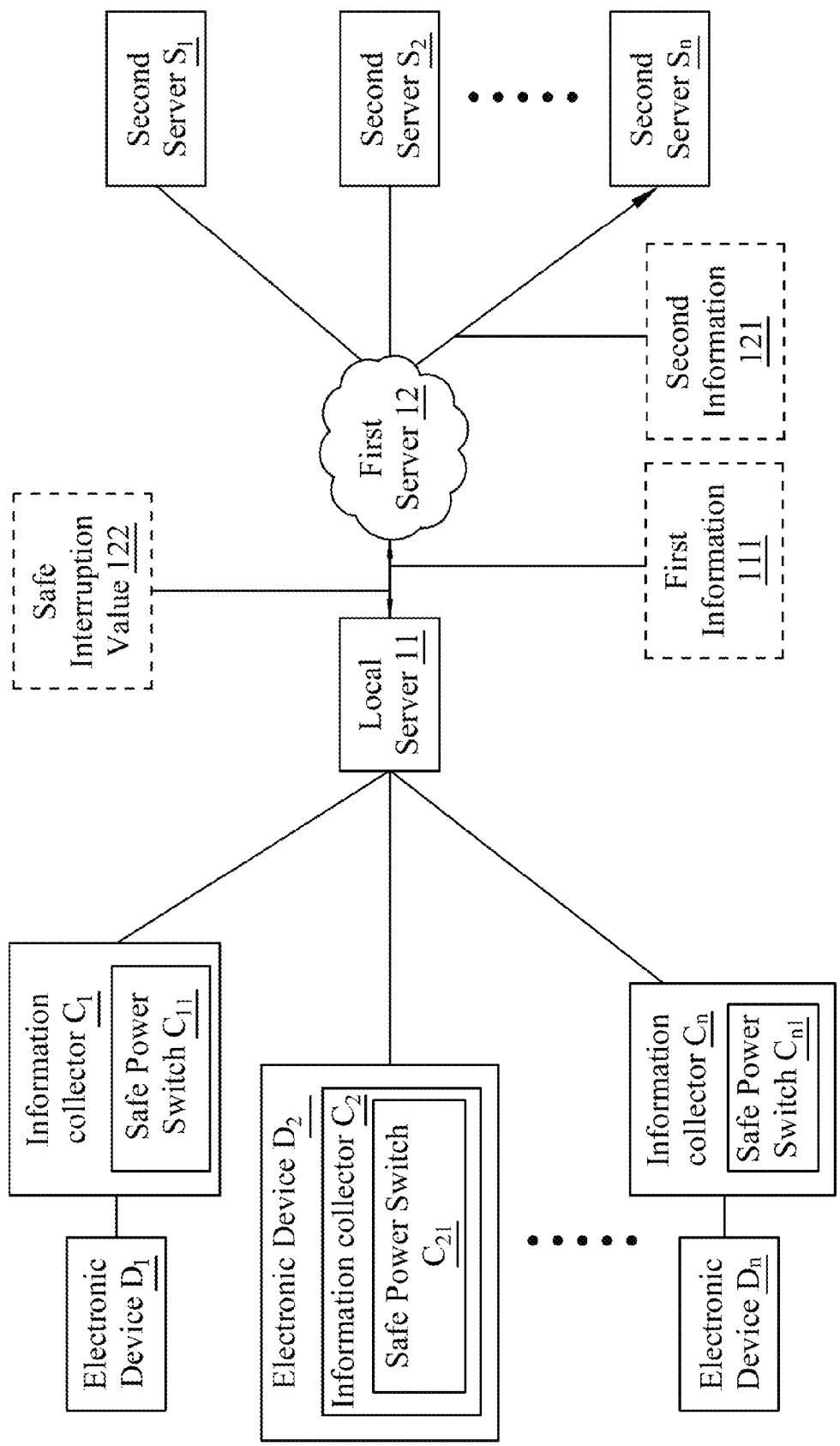
FIG. 3 is a block diagram of a cloud management method of electronic devices in accordance with the second embodiment of the present invention.

Referring to FIG. 3, after registering the electronic devices D1 to the personal account of the user 10, the first server 12 or the local server 11 may automatically write back a temporary safe interruption value (not shown) obtained by analyzing a predetermined number of times of the working current or voltage of the electronic device so that the safe power switch C11 is capable of cutting the power supply of the electronic device D1 to protect the electronic device D1. Preferably, the predetermined number of times may be ten times to dozens of times. The collection and analysis of the working current or voltage of the electronic device may be started from the first working time of the information collector or from resetting the information collector after changing the connected electronic device. However, the safe interruption value 122 may be varied due to variations and interference of the environment around the electronic device D1 and the voltage used therein. Thus, when the information collector C1 starts working, the first server 12 may collect the first information 111, such as current consumption, ambient humidity and ambient temperature, of the electronic device D1 within the first few weeks of operation so as to calculate the mean value of the working current or voltage. Accordingly, the mean value of the working current or voltage may be written back to the safe power switch C11 connected to the electronic device D1 by the first server 12 to be the safe interruption value 122, as a new safe protection booting mechanism.

Alternatively, the information collector $C_1$ may connect to the first server 12 to search for the safe interruption value 122 of the electronic device $D_1$ with reference to the predetermined information 101, such as a brand, a model name or a serial number of the electronic device $D_1$, registered in the personal account. When corresponding safe interruption value 122 of the electronic device $D_1$ is not found in the first server 12, the safe power switch $C_{11}$ would applied the temporary safe interruption value 122 to be the safe interruption value 122 of the electronic device $D_1$. In an embodiment, the user 10 may manually set up the safe interruption value 122 as well. However, the safe interruption value 122 may not exceed the rated current determined by the manufacturer of the electronic device $D_1$. If the safe interruption value 122 is higher than the rated current set by the manufacturer, the rated current is written back to the safe power switch $C_{11}$ as a substituted safe interruption value 122 by the first server 12.

Referring to FIG. 4, in an embodiment, when the electronic device $D_1$ are under abnormal working status, the first server 12 may send a message 125 of an alarm to warn the user 10 via APP of mobile devices, SMS messages or emails. Wherein, the abnormal conditions may comprise that the temperature of the electronic device $D_1$ exceeds a safe working temperature and turn-on or turn-off of the electronic device $D_1$ at non-predetermined time etc. Furthermore, when the working current or voltage of the electronic device $D_1$ surpassing a safe warning value, the local server 11 or the first server 12 may also send the message 125 to warn the user of cutting off the power supply of the electronic device $D_1$ to avoid the working current or voltage exceeding the safe interruption value 122. Preferably, the safe warning value is calculated by the average of a normal maximum working current or voltage value of the electronic device $D_1$ and the safe interruption value 122. More specifically, the normal maximum working current or voltage value is obtained by analyzing the working current or voltage of the electronic device $D_1$ for a predetermined time under normal usage. In addition, when the user declining to cut off the power supply of the electronic device $D_1$ when receiving the warning message, the normal maximum working current or voltage value is automatically elevated by the local server 11 or the first server 12 in order to elevate the safe warning value, namely, elevating the threshold of warning.

The user 10 may log in the personal account to check the alarm or the current status of the electronic devices $D_1$-$D_n$ remotely via a mobile device or a web browser. Additionally, the user may further check power consumption and a working history of the electronic devices $D_1$-$D_n$. When necessary, the user 10 may log in the account to control the information collectors $C_1$-$C_n$ and further turn on safe power switches $C_{11}$-$C_{n1}$ so that the power supply of the electronic devices $D_1$-$D_n$ may be cut off. In another embodiment, when the electronic devices $D_1$-$D_n$ are abnormally used with safety concern, the safe power switch $C_{11}$-$C_{n1}$ of the information collectors $C_1$-$C_n$ or the first server 12 may cut off the power supply of the electronic devices $D_1$-$D_n$ in response to that a working current or voltage surpasses the safe interruption value 122 or the rated current. Contrarily, the first server 12 may automatically provide the user with an analysis report. Specifically, the analysis report may comprise total working hours, a working period, a working frequency, power consumption and variations of temperature and humidity of one individual electronic device $D_1$ or all of the electronic devices $D_1$-$D_n$. Even more, the first server 12 may provide an analysis report of the individual modules of the electronic device $D_2$ when the information collector $C_2$ of the electronic device are built-in.

Figure 5:
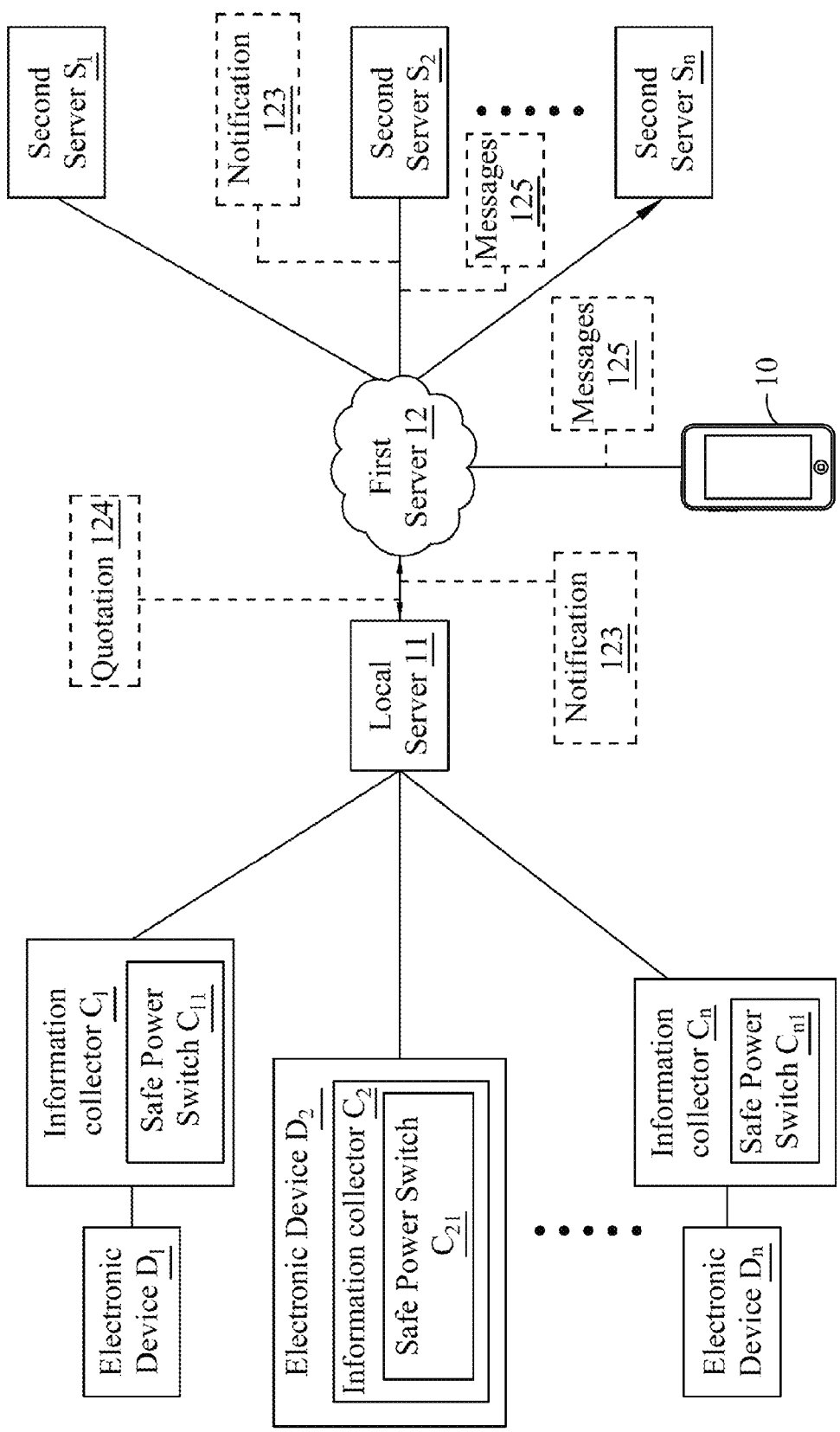
FIG. 5 is a block diagram of a cloud management method of electronic devices in accordance with the fourth embodiment of the present invention.

Referring to FIG. 5, the method in accordance with an embodiment of the present invention may improve the quality of service and reduce the consumption of energy and human labor. The user 10 may check the current consumption, working history and current status of each one of the electronic devices $D_1$-$D_n$ via APP of a mobile device or Internet. In addition, the total power consumption of the individual electronic device $D_1$ or all of the electronic devices $D_1$-$D_n$ in a period of time may be calculated periodically so as to be a parameter for saving energy or adjusting the time of using the electronic devices $D_1$-$D_n$. The first server 12 may analyze working period of individual electronic device $D_1$ in accordance with the parameter. The first server 12 may write back and adjust a setting of working period of the information collector $C_1$-$C_n$ so as to turn on the power in advance or delay the turn off process. As a result, the power consumption of the electronic devices $D_1$-$D_n$ may be reduced when the electronic devices $D_1$-$D_n$ are not in use or are in a standby mode.

When the time approaches the warranty expiration date, the first server 12 may automatically notify the user 10 by the local server 11 or the first server 12 via messages 125 in a predetermined time ahead of the warranty expiration date for reminding the user that the warranty expiration date is due. On the other hand, the first server 12 may calculate a fee of extending warranty for providing a maintenance service without a manufacturer of the electronic devices D1-Dn after a warranty expiration date, and query the user for extending the warranty expiration date by the local server 11 or the first server 12. That is, the first server 12 may automatically send a quotation 124 with a fee for extending the warranty so that the waste of manpower, and the time of communicating between the user and the manufacturer may be reduced.

In an embodiment, when a working current or voltage of the electronic devices $D_1$, $D_2$ exceed a normal range recorded and determined by the local server 11 or the first server 12, the local server 11 or the first server 12 may determine the electronic device $D_1$ as a malfunctioned electronic device according to the externally configured information collector $C_1$.

Specifically, when the information collector C2 is built-in to the electronic device $D_2$, the local server 11 or the first server 12 may further determine a malfunction in the internal modules of the electronic device D2. In response to the malfunction, the information collector C1 automatically sends a notification to the user or the first server 12 through the local server 11 to notify the user. Subsequently, the first server 12 would notify the second server S1 to automatically generate a quotation for maintaining the electronic devices D1, D2 and provide the quotation to the local server 11 via the first server 12. When the user decline to maintain the malfunctioned electronic device, the first server 12 would demonstrate other electronic device with similar function to the user so that the user may directly purchase a new electronic device.

In an embodiment, in case of that the malfunctioned electronic device $D_2$ is within the period of warranty, the first server 12 would send a notification 123 to notify the user and the customer service department of the manufacturer, i.e. the second server $S_2$, according to the malfunctioned module and maintenance chart reported by the information collector $C_2$. When the user replies the actual status of the malfunction with an approval for the maintenance, the first server 12 may notify the customer service department of the manufacturer to prepare the spare parts for the malfunctioned module. In addition, the customer service department of the manufacturer may send maintenance staff or the spare parts to the user 10 according to the maintenance chart replied by the user 10 to maintain the malfunctioned module. Thus, the human labor and time for the communication between the user and maintenance staff may be saved.

In another embodiment, in case of that the warranty of the malfunctioned electronic device $D_2$ is expired, the first server 12 would send a notification 123 to notify the user and the customer service department of the manufacturer, i.e. the second server $S_2$, according to the malfunctioned module and maintenance chart reported by the information collector $C_2$. When the user replies the actual status of the malfunction, an approval for the maintenance and an agreement to the terms of payment, the first server 12 may notify the customer service department of the manufacturer to prepare the spare parts for the malfunctioned module. In addition, the customer service department of the manufacturer may send maintenance staff or the spare parts to the user according to the maintenance chart replied by the user to maintain the malfunctioned module. Thus, the human labor and time for the communication between the user and customer service personnel may be saved as well.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A cloud management method of electronic devices, comprising following steps of:
   collecting at least one first information from an electronic device by an information collector comprising a safe power switch;
   calculating a temporary safe interruption value by the information collector via analyzing a predetermined number of times of a working current or voltage of the electronic device, and calculating a safe interruption value by a local server or a first server;
   writing back the temporary safe interruption value or the safe interruption value to the safe power switch; and
   warning the user of cutting off power supply of the electronic device by the local server or the first server in response to an abnormal working status of the electronic device, wherein the abnormal working status of the electronic device comprises exceeding a safe working temperature, and turn-on or turn-off of the electronic device in a non-predetermined time;
   wherein the power supply of the electronic device is cut off by the safe power switch in response to the working current or voltage surpassing the temporary safe interruption value or the safe interruption value.

2. The cloud management method of claim 1, further comprising a step of compiling and uploading the at least one first information to the first server via the local server through a network immediately or in a predetermined time interval.

3. The cloud management method of claim 1, wherein the information collector is built-in to the electronic device.

4. The cloud management method of claim 3, further comprising a step of registering the electronic device with predetermined information automatically to a personal account in the first server.

5. The cloud management method of claim 4, wherein the predetermined information comprising a brand, a model name, a serial number, a first working time, an installed position, internal modules data, the safe interruption value, a manufacturer and a warranty expiration date of the electronic device is automatically registered to the personal account in the first server when the electronic device is connected to the first server via the local server.

6. The cloud management method of claim 3, further comprising a step of determining a malfunction of internal modules of the electronic device by the local server or the first server according to the built-in information collector connected to internal module sensors in the electronic device.

7. The cloud management method of claim 6, wherein the internal modules comprise a power module, a video module, an audio module, a driving module, a heating module and a timer module.

8. The cloud management method of claim 3, wherein the at least one first information comprises a real-time working status of internal modules, a real-time current consumption of the electronic device, ambient temperature and ambient humidity.

9. The cloud management method of claim 8, further comprising a step of obtaining at least one second information by analyzing the at least one first information by the first server.

10. The cloud management method of claim 9, wherein the at least one second information comprises an actual mean time between failures (MTBF), a malfunction time, a malfunction frequency, a frequent malfunctioned module, a working period, total working hours and working status records of the electronic device.

11. The cloud management method of claim 1, wherein the information collector is externally configured with the electronic device.

12. The cloud management method of claim 11, further comprising a step of registering the electronic device with predetermined information manually to a personal account in the first server by the user.

13. The cloud management method of claim 12, wherein the predetermined information comprises a brand, a model name, a serial number, a first working time, an installed position, a manufacturer, a warranty expiration date and the safe interruption value of the electronic device.

14. The cloud management method of claim 13, wherein the safe interruption value is found and written back to the safe power switch by the local server or the first server with reference to the predetermined information.

15. The cloud management method of claim 11, wherein the safe interruption value of the safe power switch is further capable of being set-up by a user.

16. The cloud management method of claim 11, further comprising a step of determining a malfunction of the electronic device by the local server or the first server according to the externally configured information collector.

17. The cloud management method of claim 11, wherein the at least one first information comprises a real-time working status and a real-time current consumption of the electronic device, ambient temperature and ambient humidity.

18. The cloud management method of claim 11, further comprising a step of obtaining at least one second information by analyzing the at least one first information by the first server.

19. The cloud management method of claim 18, wherein the at least one second information comprises an actual mean time between failures (MTBF), a malfunction time, a malfunction frequency, a working period, total working hours and working status records of the electronic device.

20. The cloud management method of claim 11, wherein a rated current is written back to the safe power switch as a substituted safe interruption value by the first server in response to the safe interruption value being higher than the rated current set by the manufacturer.

21. The cloud management method of claim 1, further comprising a step of sending a notification to a user by the local server or the first server for reminding the user that a warranty expiration date is due in a predetermined time ahead of the warranty expiration date.

22. The cloud management method of claim 21, further comprising a step of querying the user for extending the warranty expiration date.

23. The cloud management method of claim 1, further comprising a step of warning a user of cutting off the power supply of the electronic device by the local server or the first server in response to the working current or voltage surpassing a safe warning value.

24. The cloud management method of claim 23, wherein the safe warning value is an average of a normal maximum working current or voltage value of the electronic device and the safe interruption value.

25. The cloud management method of claim 24, wherein the normal maximum working current or voltage value is automatically elevated by the local server or the first server in response to that the user declining to cut off the power supply of the electronic device in the warning step.

26. The cloud management method of claim 1, further comprising a step of automatically sending a notification to a user or the first server by the information collector through the local server in response to a malfunction of the electronic device.

27. The cloud management method of claim 26, further comprising a step of automatically sending a notification to the second server to notify the second server to provide a quotation to the local server.

28. The cloud management method of claim 1, further comprising a step of sending at least one second information to a second server belonging to a manufacturer of the electronic device by the first server.

29. The cloud management method of claim 28, wherein the manufacturer of the electronic device improves a design of the electronic device according to the at least one second information sent from the first server.

30. The cloud management method of claim 29, wherein the at least one second information comprises an actual mean time between failures (MTBF), a malfunction time, a malfunction frequency, a frequent malfunctioned module, a working period, total working hours and working status records of the electronic device.

31. The cloud management method of claim 1, further comprising a step of sending a maintenance request to a second server by the first server to notify a manufacturer of the electronic device to maintain a malfunction of the electronic device before or after a warranty expiration date.

32. The cloud management method of claim 1, further comprising a step of calculating a fee of extending warranty for providing a maintenance service without a manufacturer of the electronic device after a warranty expiration date.

33. The cloud management method of claim 1, further comprising a step of posting maintenance information comprising a malfunction frequency and a frequent malfunction module of the electronic device, and a maintenance speed of a manufacturer of the electronic device on a web page by the first server for consumers' reference.

34. The cloud management method of claim 1, further comprising a step of providing a user with an analysis report of an individual or all of the electronic device by the first server.

35. The cloud management method of claim 34, wherein the analysis report comprises total working hours, a working period, a working frequency, a power consumption and variations of temperature and humidity of the electronic device.

36. The cloud management method of claim 1, wherein the network comprises wired network and wireless network.

\* \* \* \* \*